Nov. 6, 1956 N. H. RUDOLPH 2,769,562
ELECTRICAL BOX
Filed Oct. 13, 1955 2 Sheets-Sheet 1
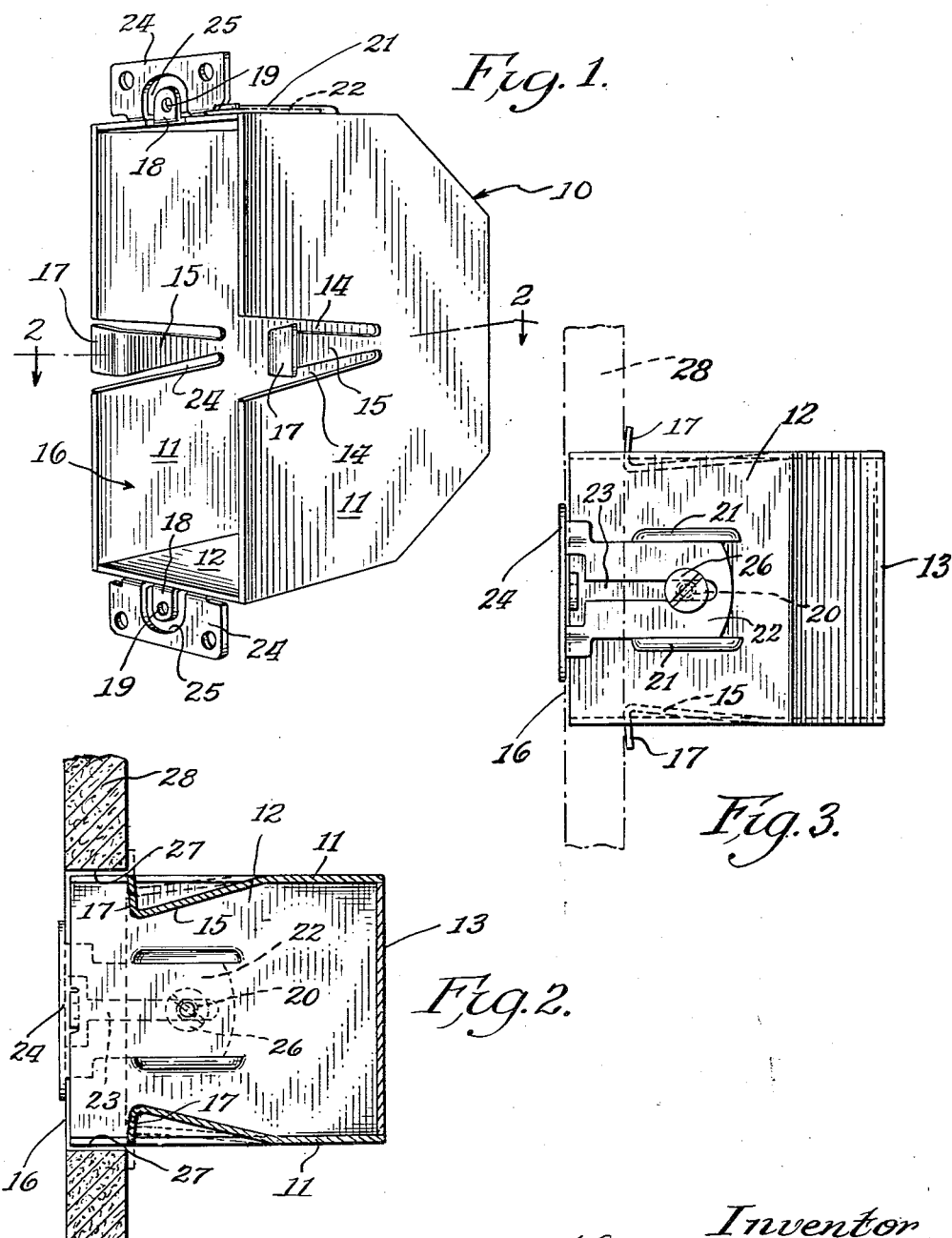
Inventor
Nathan H. Rudolph
By
Mann, Brown and Hanemann
Attys.

Nov. 6, 1956   N. H. RUDOLPH   2,769,562
ELECTRICAL BOX
Filed Oct. 13, 1955   2 Sheets-Sheet 2
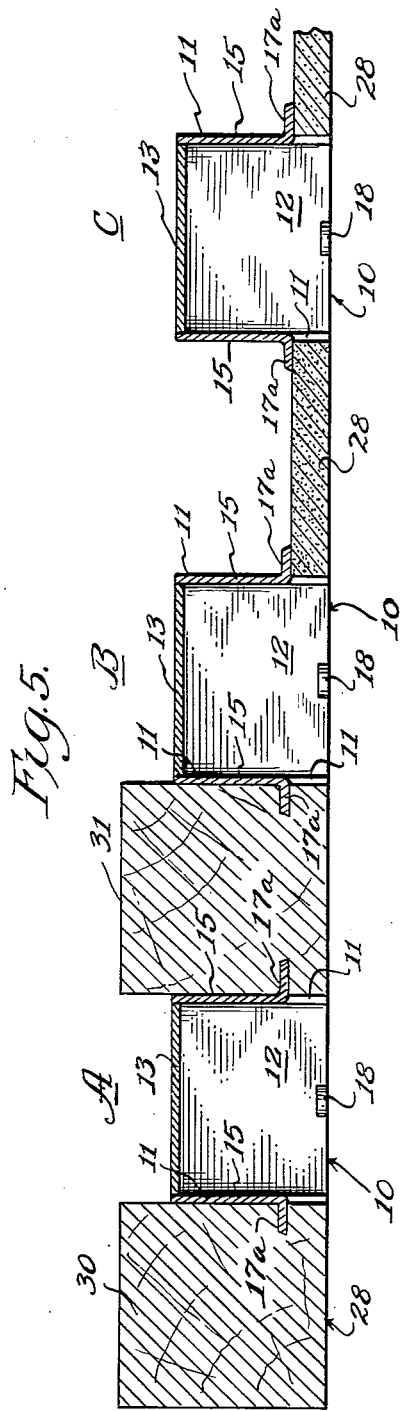
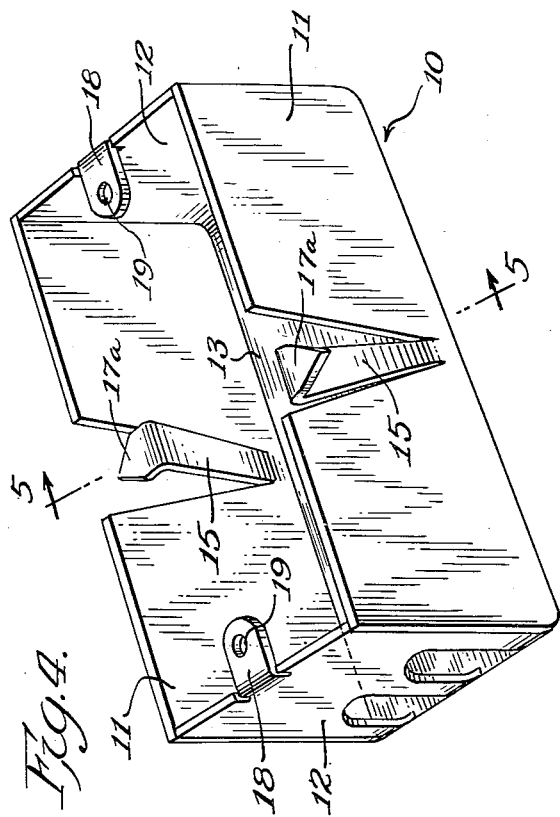
Inventor
Nathan H. Rudolph.
By
Mann, Brown and Hansmann
Attys.

United States Patent Office 2,769,562
Patented Nov. 6, 1956

2,769,562

ELECTRICAL BOX

Nathan H. Rudolph, Aurora, Ill., assignor to All-Steel Equipment Inc., Aurora, Ill.

Application October 13, 1955, Serial No. 540,434

10 Claims. (Cl. 220—3.4)

This invention relates to an electrical box adapted for mounting within a wall opening, and more particularly is concerned with a device that may be mounted on walls of plasterboard and similar type materials that cannot retain mounting screws.

A principal object of the present invention is to provide an electrical box with spaced apart flanges that are adapted for engagement with the front and rear surfaces of a wall to permit the box to be secured within an opening in the wall.

Another important object is to provide an electrical box that may be installed between two closely spaced wall studs, with flanges on the box pressed outward into the studs.

Further objects of the invention are to provide an electrical box that comprises but a minimum of parts and eliminates the necessity of mounting screws; that is simple and economical to produce and install; and that is adapted for ready removal.

Other objects and advantages of the invention will be apparent during the course of the following description.

This application is a continuation-in-part of my copending application Serial No. 512,181, filed May 31, 1955, and entitled "Electrical Box," and now abandoned. In the accompanying drawings forming a part of this specification and in which like numerals are employed to designate like parts throughout the same, Fig. 1 is a perspective view of an electrical box construction in accordance with the invention;

Fig. 2 illustrates the box in position within an opening in a supporting wall and is a sectional view through the box as taken along the line 2—2 of Fig. 1;

Fig. 3 is a top plan view illustrating the box when secured in place in the wall opening;

Fig. 4 is a perspective view of a modified form of the electrical box of this invention; and Fig. 5 is a sectional view showing three of the boxes of Fig. 4 installed in various manners.

In home and other types of construction the use of walls of plasterboard or dry wall and other similar types of materials has become quite popular and while this construction offers many advantages, it also introduces new problems one of which is very successfully solved by the arrangement of the present invention. The distinguishing characteristic which inspired the present invention is the fact that the material of these walls is not capable of receiving and retaining mounting screws and it therefore becomes desirable to find other means for mounting various devices without the use of such things as screws, nails, and like types of fasteners. Hereafter in the specification and claims, walls of the general type referred to above will be understood to be included within the term dry wall.

While the novel electrical box finds particular application to that general class of walls, herein designated dry walls, it of course is capable of use with walls of any material independently of their ability to retain fasteners and all such applications are contemplated as being within the meaning of the term dry wall.

Referring now to Fig. 1, an electrical box which may serve as either a switch box, an outlet box, a junction box or some such similar device, is generally designated as at 10, and, as shown, is provided with opposed vertical side walls 11 connected by opposed top and bottom side walls 12. The rear of the box is furnished with a rear wall 13. The particular shape of the box is not pertinent and while for the purposes of the present disclosure a specific form of box is shown, it should be apparent that the box may be circular, octagonal, square, or any other shape.

Throughout the specification and claims, the term forward shall be understood to indicate directions running through the box from the rear wall toward the front face; the term rearward shall indicate the reverse of forward; the term inward shall indicate all directions that run toward the inside of the box, and normal to the directions "forward" and "rearward"; and the term outward shall indicate all directions that run away from the box, and normal to the directions "forward" and "rearward."

In the construction shown, portions of each of the vertical side walls have been removed, as indicated at 14, to provide a tongue member 15 in each. The removed portions are illustrated as being a pair of rearwardly converging slots of substantial width that extend from the forward face 16 of the electrical box to an intermediate point of the side wall. Each of the tongues 15 is deflected inwardly. Thus each tongue 15 is anchored at its rear end to its associated side wall and extends forwardly and inwardly, and is formed at its outer end with a bent over flange portion 17 that extends substantially parallel with the forward face 16. The arrangement is such that the tongues 15 are deflected inwardly a sufficient amount so that the mounting flanges 17 terminate flush with or short of the plane of the associated side wall 11.

At their front edges the top and bottom side walls 12 are formed with the usual mounting ears 18 appropriately tapped as at 19 and extending in opposite vertical directions. The mounting ears 18 serve as anchoring facilities for a cover plate (not shown) for the electrical box. In addition, these walls are each provided with a screw hole 20 flanked by parallel tracks 21 that may be formed by suitably embossing portions of the top and bottom walls. This construction is adapted to accommodate an L-shaped mounting clip comprising a box-engaging leg 22 suitably slotted centrally thereof, as at 23, and a wall-engaging leg 24 disposed at right angles to the leg 22. The wall engaging leg or flange 24 is of substantial surface area to avoid imposing severe pressure concentrations on the supporting wall and normally is coplanar with the front face 16 of the electrical box. Accordingly it is suitably recessed as at 25 to provide clearance for the mounting ear.

The mounting clips 22 are capable of forward and rearward adjustment for cooperation with supporting walls of varying thickness, and the adjustments are of an extremely simple character, it merely being necessary to retract the screw 26 by an amount sufficient to permit the clip to slide relative to the box. The tracks 21 prevent pivotal movement of the clip and effectively guide its path of travel.

In applying the electrical box of the present invention to a wall, it is first necessary to correlate the spacing between the wall-engaging flanges 24 of the mounting clips, and the mounting flanges 17 carried by the tongues with the thickness of the supporting wall 28. This is done in the manner previously described and the box is then inserted into the opening 27 of the wall 28 until the flanges 24 are in flush engagement with the supporting wall. It is preferred that the size and shape of the opening correspond to the size and shape of the electrical box, and for that reason it is important that the mounting flanges 17 carried by the tongues 15 terminate short of or at least flush with the side walls. This construction insures that there will be no conflict between these flanges and the adjacent wall portions during the insertion of the box. After the box is inserted in position, the tongues 15 may be forced apart by any suitable tool so that the flanges 17 move from the full line position of Fig. 2 to the dotted line position and engage the rear surfaces of the supporting wall 28. The extremities of the flanges may be appropriately rounded or reversely curved, if desired, to eliminate the possibility of gouging the wall.

Electrical boxes are made of steel that is readily deformable and that remains in the shape into which it is formed or bent, and for this reason the tongues remain in engagement with the wall without using any other retaining means. It is a feature of the present invention that this particular construction is most readily adapted for easy removal of the box. By deflecting the tongues inwardly and then bending the mounting flange portion 17 outwardly, it will be seen that when the tongues are finally spread apart it is not necessary for them to pass completely through the opening in the side wall in order to insure adequate bearing contact. Thus the tongues 15 remain at least partially within the box and are accessible to an instrument such as a screw driver that may be passed through the front face 16 of the box for the purpose of retracting the tongues in order to facilitate removal of the box. To insure adequate bearing contact without requiring the entire tongue to be forced beyond the side walls of the box, the mounting flanges are of substantial width and length.

In this regard the relatively wide slots 14 permit access to the tongues 15 for the purpose of removal even if they are deflected to such an extent that they lie flush with the side wall 11.

It will be noted that the tongues are formed by slots that extend to the forward edge of the side walls. However, it is not necessary in every case that this construction be used. It was found that for most applications the thickness of the supporting wall is such as to make this arrangement most desirable.

Thus the objects of the present invention have been accomplished in that the box may be secured in place within a wall opening entirely by the engagement of the flanges 24 and 17 against the front and rear surfaces, respectively, of the supporting wall. In standardized applications in which the wall thickness is constant, the box may be of simple one piece construction, and is readily removed by retracting the deformable tongues.

Fig. 4 shows in perspective a modified form of the electrical box of this invention. As seen from that figure, mounting flanges 17a are rather sharply pointed. As a result, when tongue 15 is pressed outward it is readily forced into firm engagement with an adjoining wooden member such as a vertical wooden post or wall stud. This arrangement provides many of the advantages of the embodiments of Fig. 1, and in addition gives wide flexibility of installation according to various requirements of the job.

Some prefabricated houses, among others, require electrical boxes to be installed between two closely spaced studs. This is extremely difficult with conventional boxes, but the modification of the electrical box of this invention now being discussed is especially well adapted for such installations.

Fig. 5 shows how this modified form may be installed in any of three different ways. The view given in Fig. 5 shows a section of three electrical boxes 10 taken along line 5—5 of Fig. 4, together with sectional views of the wall studs and dry wall construction of the supporting wall. At position A in Fig. 5, electrical box 10 is shown installed between two closely spaced wall studs 30 and 31 of supporting wall 28. As shown, the width of electrical box 10 is substantially the same as the spacing of studs 30 and 31. In the installed position, tongues 15 have been pressed outward to force pointed flange portions 17a into the adjacent wooden studs.

At position B, electrical box 10 is shown with one of its side walls 11 installed snugly against wall stud 31, with pointed portion 17a of tongue 15 on that side of the box driven into the stud. Opposite side wall 11 of the box fits snugly against supporting wall 28, with flange 17a of tongue 15 on that side in engagement with the rear face of the wall.

At position C, electrical box 10 is shown installed with both its flanged portions 17a pressing against the rear surface of supporting wall 28, in the same manner as flange portions 17 of the embodiment of Fig. 1 are pressed against the rear surface of the wall. With this method of attachment of the modified form of this invention being described, it is desirable to have the fit of side walls 11 and end walls 12 of the box against supporting wall 28 as snug as possible. In addition, the cover plate of the box (not shown) helps to secure the electrical box in its installed position in the supporting wall.

A box installed as shown at position A of Fig. 5, however, is so securely attached that flange portions 17a alone provide a firm and reliable connection with the wall. The same is true, though to a lesser extent, of the type of installation shown at position B in Fig. 5.

Because of the added stability furnished by driving pointed flange portions 17a into adjacent wooden members 30 and 31, it is not necessary to arrange flanges 18 in opposition to flanges 17a as was the case with flanges 18 and 17 in the embodiment shown in Fig. 1. Thus, as shown in Fig. 4, flanges 18 may be bent toward the inside of the electrical box instead of extending outwardly. As a result, the volume of space available for use inside the electrical box is greatly increased. Screw holes 19 are spaced apart at the same distance in Figs. 1 and 4, but as will be seen the end walls 12 of the box are considerably farther apart in the latter figure than in the former. The resulting increased useful working space within the box is one of the advantages of the modified form of this invention being described.

If the conditions of use render it desirable, mounting clips 22 of the embodiment of Fig. 1 may be combined with the pointed flange portions 17a of Fig. 4. In such case, the electrical box is secured to the supporting wall by the pressure of wall-engaging leg or flange 24 against the front surface of the wall and also by insertion of pointed flanges 17a in the wall.

It will be seen that the modified form of this invention shown in Fig. 4 offers wide flexibility of installation, together with a large working space, easy and reliable installation, and convenient removal whenever desired.

I claim:

1. For mounting within an opening in a supporting wall, an electrical box having two sets of mounting flanges spaced apart a distance substantially corresponding to the thickness of said supporting wall, the first of said sets extending outwardly from said electrical box for engagement with the front face of said wall, and the second of said sets being carried by deformable tongue means anchored to side wall portions of said box and extending forwardly and inwardly across openings therein, said second set of flanges extending outwardly and terminating short of the adjacent supporting wall portions to facilitate insertion of the box in said opening, said second set of flanges being adapted upon outward deformation of said tongue means for engagement with the rear face of said supporting wall.

2. For mounting within an opening in a supporting wall, an electrical box having two sets of mounting flanges spaced apart a distance substantially corresponding to the thickness of said supporting wall, the first of said sets extending outwardly from said electrical box for engagement with the front face of said wall, and the second of said sets being carried by deformable tongues anchored to the side walls of said box and extending forwardly and inwardly across openings therein, said second set of flanges extending outwardly and terminating short of the adjacent supporting wall portions to facilitate insertion of the box in said opening, said second set of flanges being adapted upon deforming said tongues outwardly for engagement with the rear face of said supporting wall.

3. For mounting within an opening in a supporting wall, an electrical box having outwardly extending flanges adapted for engagement with the front face of said wall, and having deformable side wall portions anchored thereto and extending generally forwardly and inwardly, the free end of said side wall portions being formed with mounting flanges that extend outwardly and terminate short of the adjacent supporting wall portions, said side wall portions being deformable to permit deflection thereof outwardly for engaging said mounting flanges against the rear face of the said supporting wall.

4. For mounting within an opening in a supporting wall, an electrical box having two sets of mounting flanges spaced apart a distance substantially corresponding to the thickness of said supporting wall, the first of said sets extending outwardly from the forward face of said electrical box for engagement with the front face of said wall, and the second of said sets being carried by deformable tongue means anchored to side wall portions of said box and extending forwardly and inwardly across openings therein, said second set of flanges extending outwardly and terminating short of the adjacent supporting wall portions to facilitate insertion of the box in said opening, said second set of flanges being adapted upon outward deformation of said tongue means for engagement with the rear face of said supporting wall.

5. For mounting within an opening in a supporting wall, an electrical box having two sets of mounting flanges spaced apart a distance substantially corresponding to the thickness of said supporting wall, the first of said sets extending outwardly from said electrical box for engagement with the front face of said wall, and the second of said sets being carried by deformable tongue means anchored to opposed side wall portions of said box and extending forwardly and inwardly across openings therein, said second set of flanges extending outwardly and terminating short of the adjacent supporting wall portions to facilitate insertion of the box in said opening, said second set of flanges being adapted upon outward deformation of said tongue means for engagement with the rear face of said supporting wall.

6. For mounting within an opening in a supporting wall, an electrical box having outwardly extending flanges adapted for engagement with the front face of said wall and having deformable side wall portions anchored thereto and extending generally forwardly and inwardly, said deformable side wall portions being spaced laterally from the adjacent side wall portions to provide a substantial clearance, the free end of said deformable side wall portions being formed with mounting flanges that extend outwardly and terminate short of the adjacent supporting wall portions, said deformable portions being adapted for deflection outwardly for engaging said mounting flanges against the rear face of said supporting wall.

7. For mounting within an opening in a supporting wall, an electrical box having mounting flanges carried by deformable tongue means, said tongue means being anchored to side wall portions of said box and extending forwardly and inwardly across openings therein, said flanges extending outwardly and terminating short of the adjacent supporting wall portions to facilitate insertion of the box in said opening in the supporting wall, said flanges being adapted for engagement with adjacent portions of the supporting wall.

8. For mounting within an opening in a supporting wall, an electrical box having mounting flanges carried by deformable tongue means, said tongue means being anchored to side wall portions of said box and extending forwardly and inwardlly across openings therein, said flanges extending outwardly and terminating short of the adjacent supporting wall portions to facilitate insertion of the box in said opening in the supporting wall, the outer ends of said flanges being pointed so that upon outward deformation of said tongue means the flanges can be driven into and firmly engage adjacent portions of the supporting wall.

9. For mounting within an opening in a supporting wall, an electrical box having mounting flanges carried by deformable tongue means, said tongue means being anchored to side wall portions of said box and extending forwardly and inwardly across openings therein, said flanges extending outwardly and terminating short of the adjacent supporting wall portions to facilitate insertion of the box in said opening in the supporting wall, the outer ends of said flanges being pointed so that upon outward deformation of said tongue means the flanges can be driven into and firmly engage adjacent portions of the supporting wall, and lugs mounted on the end walls of said box for attachment of a cover plate, said lugs extending inwardly from said end walls.

10. For mounting within an opening in a supporting wall, an electrical box having mounting flanges carried by deformable tongue means, said tongue means being anchored to side wall portions of said box and extending forwardly and inwardly across openings therein, said flanges extending outwardly and terminating short of the adjacent supporting wall portions to facilitate insertion of the box in said opening in the supporting wall, the outer ends of said flanges being pointed so that upon outward deformation of said tongue means the flanges can be driven into and firmly engage adjacent portions of the supporting wall, and a second set of mounting flanges spaced apart from said pointed flanges a distance substantially corresponding to the thickness of said supporting wall, said second set of mounting flanges extending outwardly from said electrical box for engagement with the front face of the supporting wall.

No references cited.